United States Patent [19]  
Ridyard

[11] 4,060,383  
[45] Nov. 29, 1977

[54] MONOAZO DYESTUFFS
[75] Inventor: Denis Robert Annesley Ridyard, Manchester, England
[73] Assignee: Imperial Chemical Industries Limited, London, England
[21] Appl. No.: 633,558
[22] Filed: Nov. 19, 1975

Related U.S. Application Data
[60] Continuation of Ser. No. 498,853, Aug. 19, 1974, abandoned, which is a division of Ser. No. 252,576, May 12, 1972, abandoned.

[30] Foreign Application Priority Data
May 17, 1971 United Kingdom ............... 15272/71

[51] Int. Cl.$^2$ ........................... D06P 1/39; D06P 3/34
[52] U.S. Cl. ...................................... 8/41 B; 260/206
[58] Field of Search ............... 8/41 B, 41 R; 260/206

[56] References Cited
U.S. PATENT DOCUMENTS
3,535,306 10/1970 Altermatt ........................... 260/207.1
3,663,531 5/1972 Liechti .................................. 260/206

FOREIGN PATENT DOCUMENTS
275,230 8/1928 United Kingdom ................. 260/206

Primary Examiner—Christopher A. Henderson, Jr.
Attorney, Agent, or Firm—Cushman, Darby & Cushman

[57] ABSTRACT

Monoazo dyestuffs having the general formula:

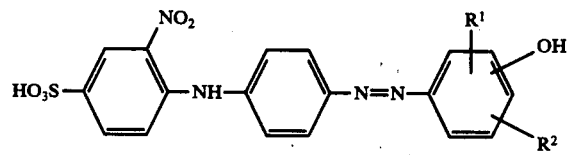

in which the hydroxyl group is in the 2- or 4-position relative to the azo group and wherein $R^1$ represents a hydrogen or halogen atom or an alkyl, cycloalkyl, aryl or alkoxy group and $R^2$ represents a hydrogen atom or alkyl group.

The dyestuffs are useful as acid dyes for nylon.

1 Claim, No Drawings

MONOAZO DYESTUFFS

This is a continuation of application Ser. No. 498,853 filed Aug. 19, 1974 which is a divisional of Ser. No. 252,576 filed May 12, 1972, both now abandoned.

This invention relates to monoazo dyestuffs and their application to textile materials.

BACKGROUND OF THE INVENTION

As will be appreciated, numerous monoazo dyestuffs and processes for using the same to dye textile materials, including synthetic polyamide textiles are known (see, for example, British Pat. No. 275,230). The invention is concerned with the provision of certain improvements in dyeing synthetic polyamide textile materials using a special class of monoazo dyestuff.

BRIEF SUMMARY OF THE INVENTION

According to the invention there is provided a process for dyeing synthetic polyamide textile materials which comprises using monoazo dyestuffs having the general formula:

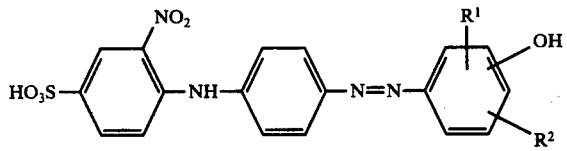

in which the hydroxyl group is in the 2- or 4-position relative to the azo group and wherein $R^1$ represents a hydrogen or halogen atom or an alkyl, cycloalkyl, aryl or alkoxy group and $R^2$ represents a hydrogen atom or alkyl group.

Halogen atoms which may be represented by $R^1$ include chlorine and bromine atoms. Alkyl groups which may be represented by $R^1$ and $R^2$ and alkoxy groups which may be represented by $R^1$ include lower alkyl and lower alkoxy groups, that is to say groups containing from one to four carbon atoms.

Particularly useful dyestuff structures have the general formula:

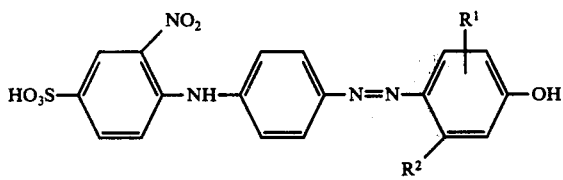

wherein $R^1$ is hydrogen and $R^2$ is lower alkyl and especially the structure where $R^2$ is methyl.

DESCRIPTION OF THE INVENTION

The dyestuffs used in the process of the present invention may be prepared by diazotising 2'-nitro-4-aminodiphenylamine-4'-sulphonic acid and coupling the resulting diazo compound with a phenol of the formula:

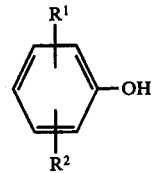

wherein $R^1$ and $R^2$ have the meanings already stated.

Suitable phenols for use in making the dyestuffs of the invention include phenol, m-cresol, o-cresol, p-cresol, o-chlorophenol, 2,5-dimethylphenol, 6-chloro-3-methylphenol, 3,5-dimethylphenol, 2,6-dimethylphenol, 2-methoxyphenol, 3-methoxyphenol, 4-methoxyphenol, 2,4-dimethylphenol, 3,4-dimethylphenol, 4-t-butylphenol, 2-hydroxydiphenyl and 4-cyclohexylphenol.

The dyestuffs of the present invention are particularly suitable for applying to synthetic polyamide textile materials, for example nylon 66, nylon 6 and nylon 11, using any of the general methods known for the application of acid dyestuffs to such materials. The dyestuffs, if desired, may be diluted with any of the usual adjuvants which are used commercially to provide products of consistent strength. These include sodium chloride, sodium sulphate, sucrose and, in particular, dextrine. The dyestuffs give reddish-yellow colourations having a high degree of fastness to wet treatments and to light. In addition, the dyestuffs provide better coverage of barre nylon and better levelling properties than corresponding dyes in which the hydroxyl group is replaced by a p-toluene sulphonic ester group and have higher tinctorial strength.

The invention is illustrated but not limited by the following Example in which all parts and percentages are by weight.

EXAMPLE

A solution of 40 parts of 2'-nitro-4-aminodiphenylamine-4'-sulphonic acid (77.7%) in 500 parts of water and 12 parts of 36% sodium hydroxide solution is stirred at 20° C and 60 parts of 2N sodium nitrite solution is added. The mixture is added with vigorous agitation during 20 minutes at 10°-15° C to 30 parts of 36% hydrochloric acid in 400 parts of water. After stirring for 1 hour at 10°-15° C, the diazo suspension is added during 30 minutes at 0°-5° C to a stirred solution of 11 parts of m-cresol in 500 parts of water, 20 parts of 36% sodium hydroxide solution and 20 parts of sodium carbonate. Stirring is continued for a further 16 hours and the product is filtered off, washed with 5% brine solution and dried.

When applied to Nylon 66 from a neutral to weakly acid bath a strong reddish yellow shade is obtained which exhibits good coverage of barreness and levelling combined with very good wet fastness and excellent light fastness.

If the *m* cresol in the above Example is replaced by the equivalent amounts of phenol, o-cresol, p-cresol, o-chlorophenol, 2,4-dimethylphenol, 3,5-dimethylphenol, 2-methoxyphenol, 3-methoxyphenol, 4-methoxyphenol, 2,6-dimethylphenol or 2,5-dimethylphenol, dyestuffs with similar properties are obtained.

I claim:

1. A process for the coloration of synthetic polyamide textile materials which comprises applying thereto an aqueous solution of a monoazo dyestuff consisting of a dye having the formula

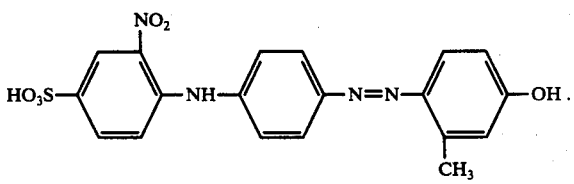

* * * * *